United States Patent
Chatterjee et al.

[11] Patent Number: 6,065,195
[45] Date of Patent: May 23, 2000

[54] METHOD OF MANUFACTURING INKJET PRINT HEAD BASE ELEMENTS BY SACRIFICIAL MOLDING

[75] Inventors: Dilip K. Chatterjee; Syamal K. Ghosh; Glen S. Lichtenberg, all of Rochester, N.Y.

[73] Assignee: Eastman Kodak Company, Rochester, N.Y.

[21] Appl. No.: 09/146,791

[22] Filed: Sep. 3, 1998

Related U.S. Application Data

[63] Continuation-in-part of application No. 08/931,174, Sep. 16, 1997, Pat. No. 5,900,201.

[51] Int. Cl.[7] .................................................. H04R 17/00
[52] U.S. Cl. ..................... 29/25.35; 29/890.1; 264/109; 264/669; 264/670
[58] Field of Search .................. 29/25.35, 890.1; 264/109, 669, 670

[56] References Cited

U.S. PATENT DOCUMENTS

| | | | |
|---|---|---|---|
| 2,847,314 | 8/1958 | Fisher | 106/39 |
| 4,734,237 | 3/1988 | Fanelli et al. | 264/122 |
| 4,894,194 | 1/1990 | Jannet | 264/109 |
| 4,908,172 | 3/1990 | Sterzel et al. | 264/63 |
| 5,132,255 | 7/1992 | Takeuchi et al. | 501/94 |
| 5,188,780 | 2/1993 | Lange et al. | 264/63 |
| 5,238,627 | 8/1993 | Matsuhisa et al. | 264/63 |
| 5,248,998 | 9/1993 | Ochiai et al. | 346/140 R |
| 5,250,251 | 10/1993 | Fanelli et al. | 264/328.2 |
| 5,270,740 | 12/1993 | Naruse et al. | 346/140 R |
| 5,301,404 | 4/1994 | Ochiai et al. | 29/25.35 |
| 5,311,218 | 5/1994 | Ochiai et al. | 346/140 |
| 5,327,627 | 7/1994 | Ochiai et al. | 29/25.35 |
| 5,465,108 | 11/1995 | Fujimoto | 347/68 |
| 5,598,196 | 1/1997 | Braun | 347/68 |
| 5,738,799 | 4/1998 | Hawkins et al. | 216/27 |
| 5,796,207 | 8/1998 | Safari et al. | 310/358 |
| 5,820,771 | 10/1998 | Burke et al. | 216/27 |
| 5,900,201 | 5/1999 | Chatterjee et al. | 264/109 |
| 5,908,588 | 6/1999 | Ghosh et al. | 264/28 |

OTHER PUBLICATIONS

Ceramic Materials and Components For Engines, "Direct Coagulation Casting (DCC)—Principles of a New Green Shaping Technique" by T.J. Graule, F.H. Baader and L.J. Gauckler; pp. 626–630.
Product Handbook for Z402 Rapid Prototyping System by Z Corporation.
Product Handbook for Actua 2100 by 3D Systems.
Product Handbook for ModelMaker II by Sanders Prototype, Inc.

*Primary Examiner*—Carl E. Hall
*Assistant Examiner*—Davide Caputo
*Attorney, Agent, or Firm*—Mark G. Bocchetti

[57] ABSTRACT

A method for making ink jet print head base elements which includes the steps of making a sacrificial mold of the ink jet print head, binder coagulation casting a ferroelectric, piezoelectric ceramic slurry into the sacrificial mold to form a green ceramic base element, and sintering the green ceramic base element while in the sacrificial mold to thereby burn off the sacrificial mold and yield a sintered, net shape, molded ink jet print head. complex shapes to thereby reduce the numbers of complex manufacturing steps. A three dimensional jet printing process can be used to form the sacrificial molds. Once the sacrificial mold has been made, a ferroelectric material (and preferably a piezoelectric material) is prepared using a binder coagulation process. The slurry of the ferroelectric material, preferably lead zirconium titinate ($PbZrTiO_3$ hereinafter referred to as PZT) is poured into the mold. Once the ferroelectric material is poured into the mold, a chemical initiator is added. After the PZT solidifies, the green ceramic component is placed in a furnace and sintered at about 1200° C.

19 Claims, 1 Drawing Sheet

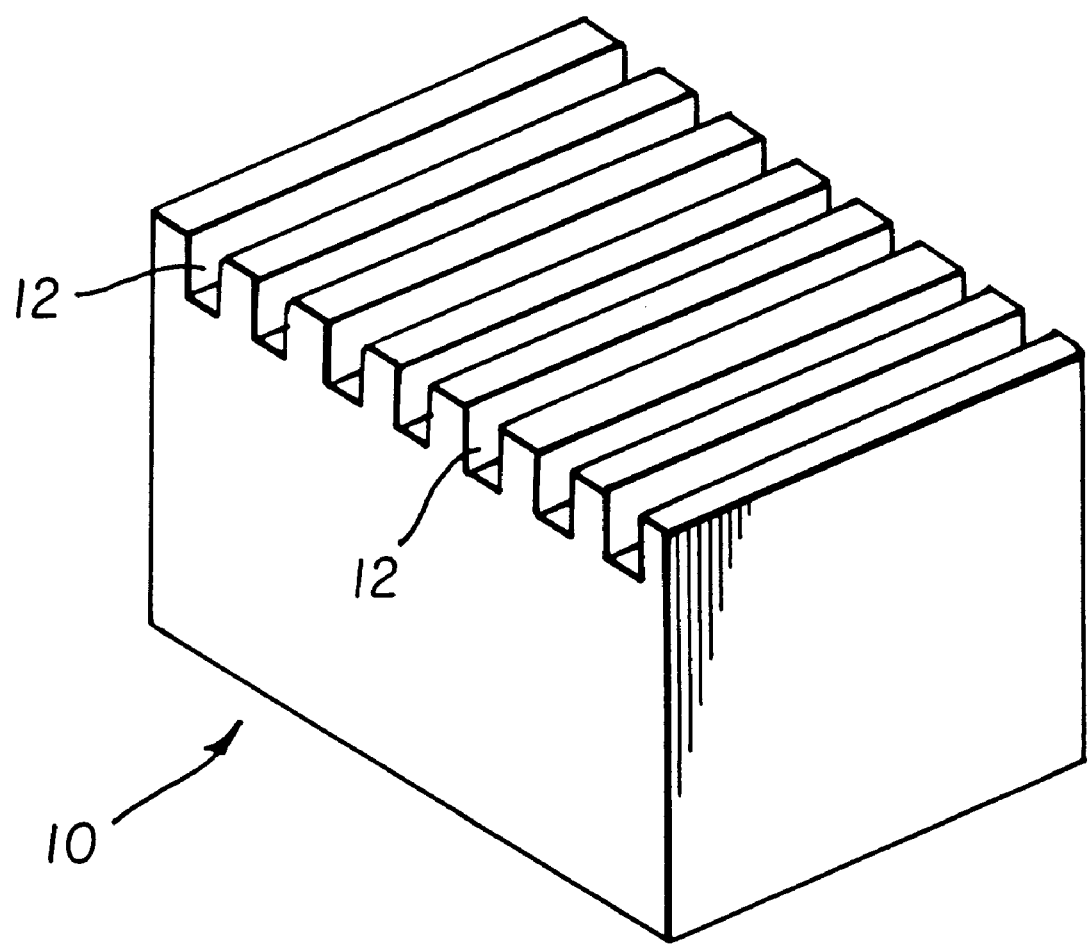

METHOD OF MANUFACTURING INKJET PRINT HEAD BASE ELEMENTS BY SACRIFICIAL MOLDING

This is a continuation-in-part application of application Ser. No. 08/931,174, filed Sep. 16, 1997 now U.S. Pat. No. 5,900,201.

FIELD OF THE INVENTION

The present invention relates generally to inkjet print heads and, more particularly, to methods for molding ceramic inkjet print heads.

BACKGROUND OF THE INVENTION

The current practice for fabrication of inkjet print heads is typically to form a base element or body in one or more parts and cut or grind a plurality of inkjet channels therein. For example, U.S. Pat. No. 5,598,196 to Braun teaches a method for making a piezoelectric inkjet print head wherein the body of the print head is made from a piezoelectric material, preferably PZT. A diamond saw is used to cut the inkjet channels and the inkjet manifold from a sheet of pulled piezoelectric ceramic material.

U.S. Pat. No. 5,311,218 to Ochiai et al teaches a method for fabricating an inkjet printhead wherein a base plate of non-conductive, non-electrorestrictive material is laminated with a piezoelectric plate. A plurality of parallel channels are formed at predetermined intervals through the piezoelectric plate and the base plate by grinding. Similarly, U.S. Pat. No. 5,301,404, also to Ochiai et al also teaches a layered structure for an inkjet printhead. A piezoelectric member polarized in its thickness is adhesively bonded to a bottom plate. A plurality of channels which extend through the piezoelectric member into the bottom plate are formed by grinding.

For many technological applications it is desirable to fabricate ceramic parts with complex geometry. Since ceramic materials are inherently hard, shaping by machining methods after the part is fired is difficult and expensive. Therefore, it is desirable to form ceramic parts close to their final shape in order to minimize the amount of machining required on the final fired part. Two categories of methods are used to achieve complex shapes: green machining methods, and near-net shape forming methods. Green machining refers to shaping an unfired ceramic part using conventional machining methods. Near-net shape forming involves molding a slurry or paste containing ceramic powder to the desired shape. Examples of near-net shape forming processes are slip casting, injection molding and gelation-based casting methods.

Injection molding of ceramic parts occurs in a manner similar to injection molding of plastics. A granular precursor material composed of ceramic powder dispersed in a thermoplastic organic binder system is heated until it softens and is forced into a mold cavity under high pressure e.g., 30 MPa or higher. The organic binder is then removed and the compacted powder is sintered. While the process is easily automated, there are several drawbacks. Shrinkage of the thermoplastic binder can lead to internal defects in the molded part. Binder removal is slow and can be as long as several days. Binder removal can cause deformation or cracks in the final part. The high pressures and abrasive particles lead to rapid wear of the tooling.

Slip casting uses a porous mold to remove liquid from a slurry. As liquid is removed, the suspended ceramic particles consolidate, beginning at the mold surface. Since the liquid is transported from the liquid slurry through the cast layer into the mold, soluble species such as binder molecules tend to migrate resulting in their nonuniform distribution and gradients in particle packing density. It is a fairly slow process and is labor-intensive.

Gelation-based casting methods rely on a controllable transition from a liquid slurry to a semi-rigid solid once the slurry has been introduced into a mold. Advantages of gelation-based casting are that the low viscosity slurry easily takes the shape of the mold, binder content is low and can be easily removed by pyrolysis, a variety of mold materials can be used, gelation occurs without the removal of liquid so binder migration does not occur and capital costs are low since no special machinery is required.

Two gelation-based casting methods have been previously reported. Gel Casting refers to a method by which monomers and dimmers in a slurry are polymerized in situ, forming a strong gel structure. Thus, in U.S. Pat. No. 4,894,194 acrylamide monomers are mixed into a ceramic slurry. Gelation occurs when an initiator is added which polymerizes the monomers. This method has been used successfully for a wide range of powders. The main drawback of the process is that it uses acrylamides, which before polymerization are neurotoxins. Another drawback is that some mold materials have been reported to interfere with the gelation process.

Direct Coagulation Casting (DCC) involves the coagulation of electrostatically dispersed particles in the slurry. This is done by disrupting the electrostatic stabilization mechanism by altering the pH or the ionic strength of the system by means of enzyme-catalyzed reactions. The main drawback of this process is that no organic binders are involved, so the strength of the unfired casts is low. Difficulty may be encountered in handling the parts and they cannot be green machined.

Direct Coagulation Casting (DCC) has been initially described by Graule, Baader and Gauckler of the Swiss Federal Institute of Technology initially described in T. J. Graule, F. H. Baader and L. J. Gauckler, "Direct Coagulation Casting (DCC)—Principles of a New Green Shaping Technique," pp. 626–31 in Fifth International Symposium on Ceramic Materials and Components for Engines, edited by D. S. Yan, X. R. Fu and S. X. Shi, World Scientific, New Jersey, 1994. In this process an electrostatically stabilized suspension of particles is caused to coagulate by a pH shift or an increase in salt concentration which causes a lowering of the electrostatic repulsion between particles. The coagulation is driven by addition of an initiator which slowly changes the pH or ionic strength of the system.

The prior art fails to teach a method for fabricating inkjet print head base elements by net or near-net shape molding of piezoelectric ceramic materials.

SUMMARY OF THE INVENTION

Binder Coagulation Casting (BCC) is a novel near-net-shape process for fabricating ceramics. An aqueous ceramic slurry containing polyelectrolyte deflocculants such as polycarboxylic acid and high molecular weight binder is gelled in a controlled fashion by the action of a chemical initiator and/or by increasing the temperature of the slurry. The mechanism by which gelation occurs is the coagulation of dispersed ceramic particles by high molecular weight binder molecules as the level of adsorption and conformation of polymer molecules change as the pH of the system changes.

Alumina, zirconia and mixtures of these two powders have been successfully cast using the BCC process. Mullite can be cast when kaolin or alumina are added. Oxides such as silica which do not adsorb significant amounts of polyacrylic acid from solution were not found suitable for the BCC process, nor were nonoxide powders. The BCC of ferroelectric ceramic, particularly piezoelectric materials such as PZT, is heretofore unknown in the prior art.

The total organic content of specimens prepared using the BCC process may be less than 1%, and green strength is good. Specimens can be cast into fairly complex shapes and a variety of mold materials may be used. Dried casts can be green machined. Dried casts exhibited good sintering behavior and a sintered density exceeding 99% of the theoretical maximum density was achieved for alumina and zirconia ceramics.

The method comprises the steps of:
1) forming a suspension comprising water, deflocculant and ceramic powder or powders.
2) mixing the slurry to achieve good dispersion of the powder.
3) adding binder and continuing mixing.
4) adding a chemical initiator, stirring and transferring the slurry to a mold and for heating to a temperature between room temperature and 60° C.

It should be understood that inkjet print heads are complex in shape. The typical inkjet print heads which are manufactured today have features ranging in size down to 25 $\mu$m which are cut therein. It would be advantageous to be able to form even smaller features in such print heads. Smaller channels in inkjet print heads allow for more simultaneous printing per unit area and better printing resolution while requiring less movement of the carriage on which the print head is supported.

An important step in the fabrication of net or near-net shape intricate ceramic components using the BCC process is the making of sacrificial molds of complex shapes to thereby reduce the numbers of complex manufacturing steps. Through the fabrication of a sacrificial mold, the net or near-net shape intricate ceramic components such as an inkjet print head can be molded therewith using the BCC process to form a green component. The green component can then be sintered while contained in the sacrificial mold. During the sintering process, the sacrificial mold is burned away leaving the complex shaped ceramic component. A three dimensional wax jetting process such as desktop modeler systems can be used to form the sacrificial molds. Desktop modeler systems typically employ single or multi jet molten wax depositors. Through the use of these systems, molten wax is deposited onto a substrate in layers and a thermal milling or a mechanical milling process is carried out between layers. In such manner, very precise sacrificial wax molds can be built with features ranging in size down to about 40 $\mu$m.

Once the sacrificial mold has been made, a ferroelectric material (and preferably a piezoelectric material) compound is prepared using a binder coagulation process. The slurry of the ferroelectric material, preferably lead zirconium titinate (PbZrTiO$_3$ hereinafter referred to as PZT) is poured into the mold. Once the ferroelectric material is poured into the mold, a chemical initiator is added. After the PZT solidifies through the gelation process, the green ceramic component contained in the sacrificial wax mold is placed in a furnace and sintered at about 1200° C. Sintering of the green ceramic simultaneously burns away the sacrificial wax mold leaving a net shape or near-net shape base element formed of PZT. In such manner, a base element for an inkjet print head can be made without having to cut channels into the PZT material. This is a significant advantage in that cutting PZT results in generating a toxic dust. In addition, channels cut into PZT generally have a width of about 90 microns although, as mentioned above, channels with a width of 25 $\mu$m can be achieved by cutting. Using the process of the present invention, ink jet print head base elements can be molded having channels with a width as small as about 25 microns as a result of shrinkage of the green ceramic print head base element during sintering. Smaller channels allow for more simultaneous printing per unit area and better resolution without requirement for moving of the carriage on which the print head is mounted. In addition, when cutting channels into the piezoelectric material, the heat generated during the cutting operation can create channel to channel cracking as well as result in the disorganization of some of the dipole material which had been poled prior to cutting.

As an alternative to burning the sacrificial wax mold away during the sintering process, the sacrificial wax mold may also be solubilized after gelation (and thus the formation of a green ceramic base element) but prior to sintering. For example, if the wax used to form the sacrificial mold soluble in a solvent such as toluene or kerosene, then toluene or kerosene can be used to dissolve the sacrificial mold away after gelation.

BRIEF DESCRIPTION OF THE DRAWINGS

FIG. 1 is a perspective view of an exemplary inkjet print head base element.

DETAILED DESCRIPTION OF THE INVENTION

The binder coagulation casting (BCC) system (as taught in U.S. application Ser. No. 08/931,174 which is hereby incorporated herein by reference) consists of a highly loaded suspension or slurry of ceramic powder or powders in water with polymeric additives which can be gelled in a controlled manner. A low molecular weight polycarboxylic acid (usually added in the form of a neutralized salt solution) can be used as a deflocculant, to disperse the particles and lower the slurry viscosity. A binder such as a high molecular weight polycarboxylic acid is added at a level of about 0.1% of the weight of the dry powder. The slurry is gelled in a controlled fashion by adding a chemical initiator which changes the pH of the system over a time period of 10 to 60 minutes, which allows sufficient time for deairing the slurry and transferring it into a mold before the onset of gelation. Heating the mold and slurry can be performed to accelerate the gelation process. As a preferred embodiment, both heating and adding a chemical initiator are used.

Advantages of the BCC system over other near-net-shape forming processes such as injection molding and other gel casting systems are that the BCC system uses nontoxic materials, the binder content is very low, the casts have high green strength (before sintering) once dried and the casts are green machinable.

The first step in the process is forming a suspension comprising water, deflocculant and ceramic powder or powders. It may also be desirable to add other ingredients to the slurry such as pH modifier, surfactant, defoaming agent, plasticizer, etc.

It is common practice in the art to prepare ceramic slurries by first preparing a solution comprising water, deflocculant, pH modifier and other water soluble components and then adding the ceramic powder to the solution.

Polyelectrolytes such as low molecular weight salts of polycarboxylic acid are commonly used as deflocculants in ceramic slurries. It was determined that an excess of the low molecular weight deflocculant was required above the amount needed for initial deflocculation of the powder, otherwise the slurry would instantly gel on addition of the high molecular weight binder. As pH is lowered, more deflocculant is adsorbed onto the powder, and the shielding action provided by the deflocculant is reduced, allowing gelation to occur from particle bridging produced by coagulated binder molecules. The effects of thermal and chemical gelation may enhance the process by providing a mechanism for binder molecules from neighboring particles to interact with each other and form the continuous polymer-powder network required for a cast to maintain its shape. The deflocculant is preferably polyacrylic acid but can be polymethacrylic acid, polycarboxylic acid or the like. A useful range of molecular weights is 2000–15000.

The ferroelectric piezoelectric ceramic powder used to fabricate an inkjet print head base element 10 having channels 12 therein is preferably (PbZrTi)$O_3$ otherwise referred to herein as PZT. Other ferroelectric ceramic materials which can be used in the practice of the method of the present invention include BaTi$O_3$, KNb$O_3$, LiTa$O_3$, LiNb$O_3$, and combinations thereof. The amount of ceramic powder in the suspension can be from about 25% to 65% on a volume basis. The pH modifier can be an organic or inorganic acid or base and will preferably hold the slurry at a pH of 7.5 to 7.8. Glacial acetic acid is the preferred pH modifier and is generally added in the amount of 0.25 to 0.50 ml per 1000 grams of dry powder.

In step 2, the slurry is mixed to achieve good dispersion of the powder. A number of mixing methods that are commonly used in the art can be used for mixing, such as ball milling, attrition milling, ultrasonic mixing, and the like.

The third step is adding the high molecular weight binder and continuing mixing. The binder can be selected from the group comprising polyacrylic acid, polymethyacrylic acid, polycarboxylic acid and the like preferably has a molecular weight of 30,000 to 450,000. It may be desirable to add binder in the form of an aqueous solution to facilitate the dispersion of the binder uniformly throughout the slurry. The binder is generally added in the form of a 10% to 55% aqueous solution. However, the binder can be added as a powder if sufficient time is allowed for mixing, e.g., 24 hours mixing after the addition of 0.2 grams of dry binder.

While the initial slurry is typically very fluid, which allows good dispersion to occur, addition of the binder solution results in a viscosity increase. In cases where insufficient deflocculant is used, the slurry will gel upon addition of the binder. Slurry viscosity depends on the solids loading and deflocculant level. The amount of binder may also influence viscosity, but to a lesser extent. Viscosity should be low enough to allow good deairing and to allow the slurry flow into the intricate features of the mold. Useful slurry viscosities in the practice of the present invention are generally in the range of from about 500 cp to about 2500 cp. In step 4, a chemical initiator is added to the slurry and the slurry is stirred. Alternatively, the chemical initiator may be added to the slurry after the slurry has already been poured into the mold.

A vacuum of 27 to 28 in. of Hg maintained for 2 to 3 minutes or other methods are useful to remove entrained air and dissolved gases from the slurry. Entrained air forms bubbles which cause pores in the final cast. Dissolved gases form bubbles when the slurry is heated which can cause cracks in the sintered part. If additional gas is evolved after the onset of gelation, more cracks will occur. Addition of a defoaming agent is useful in initiating removal of entrained air.

The gelation process is induced by a pH change which is controlled by the initiator. Elevated temperatures increase the rate of the pH change. A secondary thermal gelation mechanism is believed to be present. When the initiator is added, the pH of the slurry rapidly drops by about 1pH unit and the slurry viscosity drops as well. This viscosity drop aids in mixing and deairing. As pH drops further, viscosity increases and gelation occurs.

Any initiator which is a chemical compound or combination of compounds that lowers the pH of the slurry in a reliable, time-dependent manner can be used. Two types chemical systems that undergo reactions that lower pH in a reliable time-dependent manner and may be used to initiate gelation are hydrolysis reactions, and enzyme catalyzed reactions. The preferred initiator is gluconolactone.

The defoamer used is generally an immiscible liquid which destabilizes liquid/vapor interfaces in a foam. Examples of useful defoamers are polypropylene glycol, petroleum derivatives, and the like.

A typical casting procedure is as follows:

1. 80 grams of slurry is weighed into a 100 ml beaker.
2. 3 drops of defoaming agent is added.
3. 0.75 grams of initiator is added and slurry is stirred briefly with a spatula.
4. A magnetic stir bar is placed in the beaker and the slurry is placed in a vacuum desiccator. While stirring, a vacuum of 28 in. of Hg is maintained for 2–3 minutes.
5. Slurry is poured into a mold. The exposed surface of the slurry is covered with an immiscible liquid to prevent drying. A flat glass cover is placed over the immiscible liquid.
6. Mold containing slurry is placed in an oven at a temperature of 21° C. to 60° C. or otherwise heated for a period of 10 to 60 minutes.
7. Mold is removed from the oven and allowed to cool for 10 to 30 minutes.

After the mold and slurry are placed in the 60° C. oven, their temperature increases with time. The maximum temperature reached depends on the time in the oven. Lower temperatures are desirable since the evolution of any gases dissolved in the liquid phase of the slurry (or possibly adsorbed on the powder surface) is more likely to occur at a higher temperature.

After the mold and slurry have been removed from the oven, the strength of the gel continues to increase. This may be from additional coagulated structure building from additional time of heating due to the residual heat in the mold and cast during the initial stage of cooling, or it may be a result of the decrease in temperature. Depending on the slurry formulation, the mold can be opened as soon as 20 minutes after it was placed in the oven. The firmness of the cast depends on the type of materials used, the solids loading in the slurry, the deflocculant level, and the casting time and temperature. The amount of binder and initiator added and the age of the slurry also influence the firmness of the cast.

Working Examples

A slurry was prepared by a ball milling 500 grams of PZT powder (having a particle size in the range of from about 1 to about 3 microns), 65 ml of water and 6.25 g of a polyelectrolyte deflocculant. The specific deflocculant used was Darvan 821A as supplied by R. T. Vanderbilt. This deflocculant is a polyacrylic acid salt with a cation base of $NH_{4+}$. The molecular weight is 6,000 and it is 40% solids. The slurry was milled for about 24 hours. After milling, a polyacrylic acid binder was added to the slurry. The specific polyacrylic acid binder was Carbopol 679 as supplied by B. F. Goodrich having a molecular weight of 450,000. The slurry was then milled for an additional 24 hours. 40 g of the slurry were then weighed out and a chemical initiator and an antifoaming agent were added to the 40 g of slurry. The initiator used was gluconolactone as supplied by Aldrich Chemical Company, CAS number 90-80-2. This chemical is also known as δ-Gluconolactone or D-gluconic acid δ-lactone. The amount of chemical initiator for 40 g of slurry should be in the range from about 0.25 to about 0.40 g. One to two drops of antifoaming agent should be added to this slurry as well. The antifoaming agent may be for example Polyglycol P1200 or foammaster S the slurry is then mixed in a vacuum for a period from about 2 to about 3 minutes and poured into the sacrificial mold as will be described herein below. The entire mold is then covered with Polyglycol P4000 and a microscope slide to prevent drying of the slurry. The sacrificial mold containing the slurry is then placed in an oven and maintained at 60° C. for a period of from about 10 to about 60 minutes. This limited heating of the mold and slurry aids in accelerating the gelation of the slurry to form a green ceramic component. The sacrificial mold with the green ceramic component is then removed from the oven and placed in a furnace for sintering. The sintering schedule is as follows: The temperature is raised 0.5° C. per minute until the temperature of 200° C. is attained. At this temperature the sacrificial mold will be burned away leaving only the green ceramic component (now partially sintered). Then the temperature is raised 1° C. per minute until a temperature of 450° C. is attained. The temperature is held at 450° C. for about 2 hours. The temperature is then raised 5° C. per minute until a temperature of 1200° C. is attained. The temperature is held at 1200° C. for about 1 hour. The temperature is then decreased at a rate of 5° C. per minute down to room temperature. The sintering process for PZT should be performed in an atmosphere of lead oxide. Those skilled in the art will recognize that if a ferroelectric ceramic other than PZT is chosen, then a different sintering schedule will be required.

In a second example, a substantially identical PZT slurry was prepared and poured into a sacrificial wax mold as recited in the first example above. However, after gelation to form a green ceramic print head base element and prior to sintering, the sacrificial was mold was removed by solubilizing the wax mold in kerosene leaving only the green ceramic print head base element which was then sintered. Alternatively, warm toluene (at about 30° C.) could be used to dissolve the sacrificial wax mold.

It should be remembered that the sacrificial mold includes features ranging down to about 40 microns in dimension. As such, the viscosity of the slurry must be such to allow it to flow easily into the fine features of the sacrificial mold. The viscosity of the slurry is preferably in the range of from about 500 cp to about 2500 cp. Most preferably, the viscosity of the slurry is about 1000 cp.

Using the method of the present invention, a base element 10 of an inkjet print head can be fabricated having channels 12 therein, each with a width of about 25 microns. This is accomplished without any sawing or grinding operation which could damage the base element 10 as well as result in the generation of a toxic dust. Once the base element 10 has been formed at the completion of the sintering process, the base element 10 can be poled. Electrodes can then be installed in channels 12 as is well known in the prior art. An orifice plate can then be installed having orifices which line up with each channel 12 through which ink is delivered from the print head. The remainder of the typical packaging used in inkjet print heads can then be installed on the base element 10.

As mentioned above, the sacrificial molds are preferably produced by means of a three dimensional jet printing system. Such systems typically employ one or more jets for which a molten wax is delivered to a substrate and then to previous layers of deposited wax. In such manner, the three dimensional jet printing system is programmable to produce a three dimensional wax object which can, in the practice of the method of the present invention, serve as a sacrificial mold. Between each layer of deposited wax, there is some sort of milling process that is performed to produce the very precise three dimensional shape desired. This milling process may be mechanical milling or thermal milling. With such desktop modeling systems, three dimensional sacrificial molds can be produced having features ranging down to about 40 µm in dimension. In the practice of the method of the present invention, the wax used to form the sacrificial mold should have a glass transition temperature of at least about 80° C. In this manner, the wax of the sacrificial mold will not begin to flow and deform the sacrificial mold when the sacrificial mold and slurry are heated up to about 60° C. to accelerate gelation.

One example of a desktop modeling system which can be used in the practice of the method of the present invention is the Actua 2100 as manufactured by 3D Systems of Valencia, Calif. The Actua 2100 is a multi-jet system which has 96 jets that deposits 90 picoliter droplets of a single type molten wax (thermopolymer material). A thermal milling process is performed between each layer of deposited wax. The Actua 2100 multi-jet modeling process uses a technique similar to inkjet or phase-change printing, applied in three dimensions. The 96 jet print head is oriented in a linear array and is used to build a sacrificial mold in successive layers. The multi-jet head shuttles back and forth like a line printer building single layer upon single layer to build a three dimensional object which, in the practice of the present invention is a sacrificial mold.

Another example of a desktop modeling system is the Sanders as made by Sanders Prototype, Inc. of Merrimack, N.H. The Sanders system uses two single jets. A part wax is applied with one jet and a support wax is applied with the second jet. A mechanical milling process is carried out between layers. Upon completion of the object being produced (in this case, a sacrificial mold), a solvent is applied to remove the support wax.

Although the three dimensional jet printing (desktop modeling) system can be used to produce sacrificial molds having features (e.g. channels 12) having a dimension of about 40 µm, it should be understood that it is the green ceramic base element that has channels 12 of that dimension. The channels 12 in the actual base element 10 will be smaller after the sintering process which causes some shrinkage of the overall base element 10.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not a limiting sense.

What is claimed is:

1. A method for fabricating an inkjet print head base element comprising the steps of:

(a) fabricating a sacrificial mold with micro-sized channels therein for the inkjet print head base element;

(b) binder coagulation casting a ferroelectric ceramic slurry into the sacrificial mold to yield a green ceramic monolithic ferroelectric base element in the sacrificial mold; and (c) sintering the green ceramic ferroelectric base element contained in the sacrificial mold and burning off the sacrificial mold and sinter the green ceramic ferroelectric base element to yield a monolithic inkjet print head base element with micro-sized channels molded therein.

2. A method as recited in claim 1 further comprising the step of:

raising the temperature of the ferroelectric ceramic slurry cast in the sacrificial mold to a temperature of up to about 60° C. for a period of from about 10 minutes to about 60 minutes prior to said heating step.

3. A method for fabricating an inkjet print head base element comprising the steps of:

(a) fabricating a sacrificial mold with micro-sized channels therein for the inkjet print head base element;

(b) forming a suspension comprising water ferroelectric ceramic powder and deflocculant at an amount in excess of that needed for initial deflocculation of the ferroelectric ceramic powder;

(c) mixing the suspension to achieve dispersion of the ferroelectric ceramic powder;

(d) adding binder having molecular weight of 30,000 to 450,000 and continuing mixing;

(e) stirring and transferring the suspension to the sacrificial mold;

(f) adding a chemical initiator to the suspension which lowers the pH of the suspension over a time period of from about 10 to about 60 minutes to induce gelation to yield a green ceramic ferroelectric base element in the sacrificial mold; and (g) sintering the green ceramic ferroelectric base element while in the sacrificial mold, to burn off the sacrificial mold and sinter the green ceramic ferroelectric base clement to yield an inkjet print head base element with micro-sized channels molded therein.

4. A method as recited in claim 3 further comprising the step of:

raising the temperature of the ferroelectric ceramic slurry cast in the sacrificial mold to a temperature of up to about 60° C. for a period of from about 10 minutes to about 60 minutes prior to said heating step.

5. A method as recited in claim 3 wherein:

the ferroelectric ceramic powder is selected from the group consisting of:
(a) PZT;
(b) $BaTiO_3$;
(c) $KNbO_3$;
(d) $LiNbO_3$;
(e) $LiTaO_3$; and
(f) combinations of two or more of the ceramic powders (a) through (e).

6. A method as recited in claim 1 wherein:

the ferroclectric ceramic powder is selected from the group consisting of:
(a) PZT;
(b) $BaTiO_3$;
(c) $KNbO_3$;
(d) $LiNbO_3$;
(e) $LiTaO_3$; and
(f) combinations of two or more of the ceramic powders (a) through (e).

7. A method as recited in claim 1 wherein:

the ferroelectric ceramic powder is a piezoelectric material.

8. A method as recited in claim 3 wherein:

the ferroelectric ceramic powder is a piezoelectric material.

9. A method as recited in claim 1 wherein:

said fabricating a sacrificial mold step is performed by three dimensional jet printing.

10. A method as recited in claim 3 wherein:

said fabricating a sacrificial mold step is performed by three dimensional jet printing.

11. A method as recited in claim 3 wherein:

said sintering step is performed to a temperature of at least about 1200° C.

12. A method as recited in claim 2 wherein:

the ferroelectric ceramic powder is a piezoelectric material.

13. A method as recited in claim 4 wherein:

the ferroelectric ceramic powder is a piezoelectric material.

14. A method for fabricating an inkjet print head base element comprising the steps of:

(a) fabricating a sacrificial mold with micro-sized channels therein for the inkjet print head base element;

(b) binder coagulation casting a ferroelectric ceramic slurry into the sacrificial mold to yield a green ceramic ferroelectric base element in the sacrificial mold;

(c) dissolving the sacrificial mold to leave the green ceramic ferroelectric base element; and (d) sintering the green ceramic ferroelectric base element to yield an inkjet print head base element with micro-sized channels molded therein.

15. A method as recited in claim 14 further comprising the step of:

raising the temperature of the ferroelectric ceramic slurry cast in the sacrificial mold to a temperature of up to about 60° C. for a period of from about 10 minutes to about 60 minutes prior to said heating step.

16. A method as recited in claim 14 wherein:

the ferroelectric ceramic powder is selected from the group consisting of:
(a) PZT;
(b) $BaTiO_3$;
(c) $KNbO_3$;
(d) $LiNbO_3$;
(e) $LiTaO_3$; and
(f) combinations of two or more of the ceramic powders (a) through (e).

17. A method as recited in claim 14 wherein:

the ferroelectric ceramic powder is a piezoelectric material.

18. A method as recited in claim 1 wherein:

said sintering step is performed to a temperature of at least about 1200° C.

19. A method as recited in claim 14 wherein:

said sintering step is performed to a temperature of at least about 1200° C.

* * * * *